Dec. 20, 1960  B. F. GANLEY  2,965,379
MOBILE HOPPERS FOR DISTRIBUTING FINELY DIVIDED MATERIALS
Filed May 8, 1957  3 Sheets-Sheet 1

Inventor
B. F. Ganley
By Glascock Downing Seebold
Attys.

Dec. 20, 1960

B. F. GANLEY 2,965,379

MOBILE HOPPERS FOR DISTRIBUTING FINELY DIVIDED MATERIALS

Filed May 8, 1957

Inventor
B. F. Ganley
By Hazent Downing Seebold
Attys

Dec. 20, 1960 B. F. GANLEY 2,965,379
MOBILE HOPPERS FOR DISTRIBUTING FINELY DIVIDED MATERIALS
Filed May 8, 1957 3 Sheets-Sheet 3

Inventor
B. F. Ganley

United States Patent Office 2,965,379
Patented Dec. 20, 1960

2,965,379
MOBILE HOPPERS FOR DISTRIBUTING FINELY DIVIDED MATERIALS

Bruce Frederick Ganley, Merrins Road, Otorohanga, New Zealand

Filed May 8, 1957, Ser. No. 657,920

10 Claims. (Cl. 275—8)

The invention relates to devices for distributing finely divided materials and in particular has reference to mobile type distributing devices from which top dressing material is distributed on to pasture lands or the like.

Known types of devices used in the distribution of top dressing materials usually consist of self-powered units in which top dressing material is passed from a bulk hopper to rotary disc type spinners for broadcasting purposes, such units usually being substantial in size and including machinery of a complex and often costly nature to facilitate the conveyance and broadcasting of top dressing material.

With the aforementioned factors in mind, the present invention seeks to provide an improved device for distributing finely divided materials which is compact and comparatively small in size when compared with known types of top dressing spreaders, yet capable of distributing top dressing material such as super phosphate or lime, in a highly efficient and thorough manner over a wider area than it has hitherto been possible with rotary type spinners, the improved device which is adapted to be operated and be towed by a tractor, being simple in construction and arrangement, and including comparatively few moving parts susceptible to breakdown.

A further object of the invention is to provide an improved device for distributing finely divided materials which includes a novel and highly useful arrangement whereby a pre-determined quantity of seed, hormone powder, trace element or other materials or additives, can be quickly and easily mixed with the top dressing material such as lime within the improved device and distributed with the latter in a pre-determined proportion for instance at a given number of ounces or pounds per acre.

According to one aspect of the invention the improved device comprises a hopper mounted on ground wheels; a lower worm centrally disposed relative to the hopper and rotatable in a trough leading to a top dressing distributing means mounted at the rear of the hopper; an endless conveyor mounted within the hopper and to each side of the lower worm and each movable toward the lower worm; an upper worm rotatable in an upper trough in the hopper; the endless conveyors, the upper and lower worms and top dressing distributing means being adapted to be driven during movement of the improved device to convey top dressing material from the hopper via the lower trough to the top dressing distributing means and material such as seed, hormones or the like from the upper trough to the lower trough for mixing with top dressing material and the resultant mixture distributed by the top dressing distributing means.

According to a further aspect of the invention the improved device comprises an open topped and boxlike hopper divided into two bins by a central compartment; a lower worm rotatable in a lower trough forming the bottom of the interior of the central compartment; adjustable openings through the walls of the central compartment and leading from the bins to central compartment; an endless conveyor movable across the bottom of each bin from the side wall of each bin to the opening in each wall of the central compartment; an upper trough positioned within the central compartment and an upper worm rotatable therein; an aperture adjustable in size leading from the upper trough to the lower trough and a top dressing distributing means mounted across the rear of the hopper, the endless conveyors and upper worm being adapted to be driven from the ground wheels of the device and the lower worm from the power take off of a tractor to pass top dressing material from the bins and the upper trough to the top dressing distributing means.

The invention will now be described in the accompanying drawings in which.

Figures 1, 4:
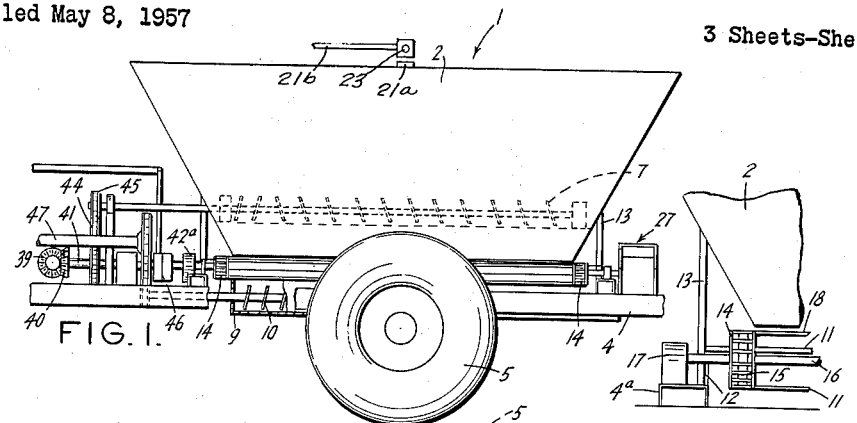
Fig. 1 is a side elevation of the improved device partly broken.
Fig. 4 is a detail view of a corner of the hopper illustrating the mounting of the hopper.
Figure 2:
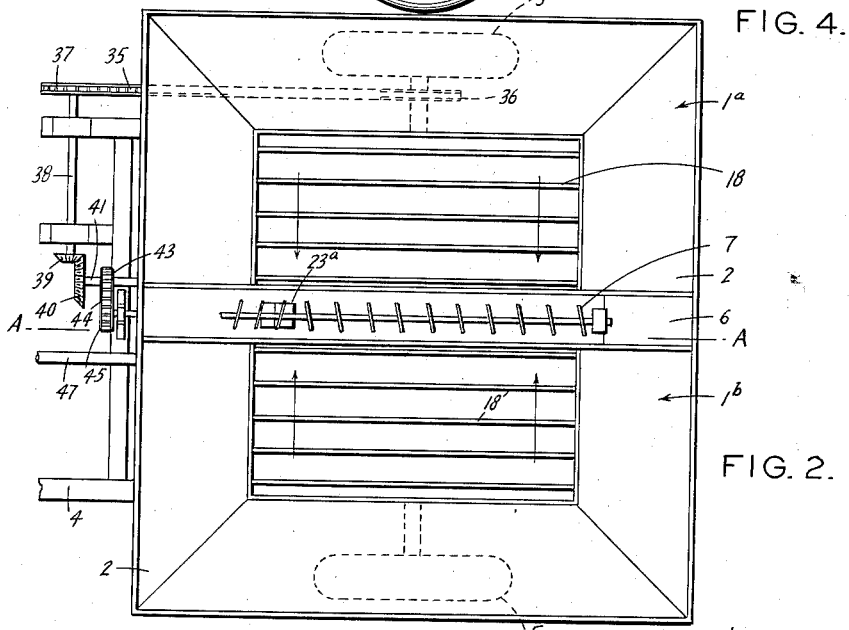
Fig. 2 is a plan view of Fig. 1.

As illustrated in the drawings with particular reference to Figs. 1 and 2 the hopper 1 is box like and rectangular in shape when viewed in plan and provided with an open top. The side walls 2 of the hopper 1 are inclined inwardly from the top of the hopper 1 to the bottom of the hopper 1 so that the bottom of the hopper 1 is less in area than the area of the open top thereof.

The hopper 1 is supported on a chassis 4 mounted on a pair of ground wheels 5, the chassis 4 extending beyond the end of the hopper 1 regarded as the front of the hopper 1 to facilitate towing of the improved device and the mounting of drives to the endless conveyors and worms and beyond the rear of the hopper to act to support the top dressing distributing means as will later be described.

The interior of the hopper 1 is divided into two bins 1a and 1b by a central narrow compartment 6, the compartment 6 housing an upper worm 7 rotatable in an upper trough 8. The bottom of the compartment 6 is open to the exterior of the bottom of the hopper 1 and open to a lower trough 9 secured on the underside of the hopper and in which a lower worm 10 is rotatable, the top of the lower trough 9 being open along its length to the bottom so that the trough 9 forms the bottom of the interior of the compartment 6.

Figure 7:
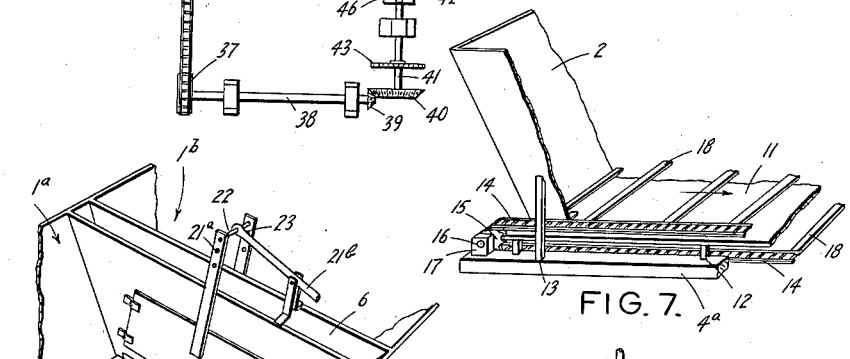
Fig. 7 is a further detail view of the hopper (broken).

As illustrated with particular reference to Fig. 7, a bottom 11 is provided for each bin 1a and 1b, the bottom 11 of each bin 1a and 1b being spaced from the bottom edges of the side walls 2 to facilitate the mounting of the endless conveyors which are adapted to move material across the bottom 11 of each bin 1a and 1b for depositing in the lower trough 9.

As shown in Fig. 7, the spacing of the bottoms 11 is provided by supports 13 supporting the side walls 2 from cross supports 4a of the chassis 4 so that an intervening space is provided between the bottom edges of the side walls 2 and the bottom of each bin 1a and 1b and through which the endless conveyors are movable. The bottom 11 of each bin 1a and 1b is also supported from the cross supports 4a by braces 12 so that the bottoms 11 are free of protuberances to enable the endless conveyors to be passed thereabout as will now be described (see Figs. 4 and 7).

Figure 6:
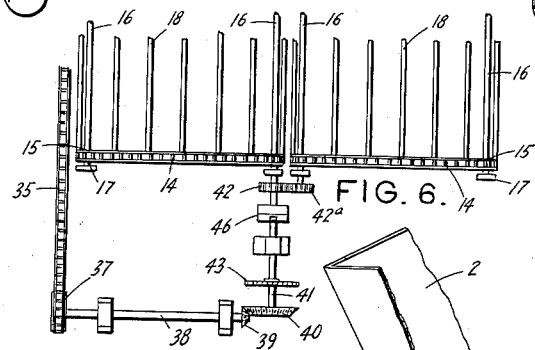
Fig. 6 is a detail view of the endless conveyors and the drive thereto (partly broken).
Figure 8:
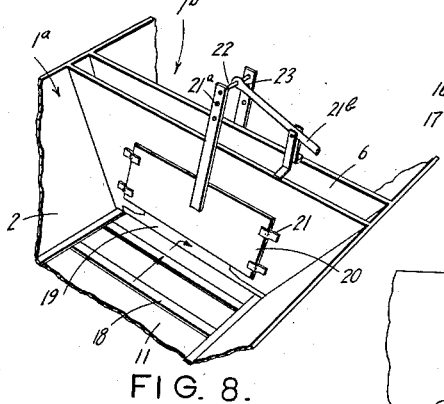
Fig. 8 is a further detail view of the hopper from another angle than shown in Fig. 7.

As illustrated in the drawings, each endless conveyor consists of a pair of endless chains 14 movable on sprockets 15 mounted on axles 16 carried in bearings 17 at the inner and outer ends of the bin bottoms 11. Cross slats 18 join and chains of each pair and as illustrated in Fig. 6, each endless conveyor passes about the bottom 11 of each bin 1a and 1b, and upon rotation, these conveyors are adapted to pass top dressing material within the bins 1a and 1b through openings 19 in the compartment 6 to the interior of the latter and to the lower worm 10 and trough 9 (see arrows Fig. 8). As illustrated in Fig. 8, the size of the openings 19 can be regulated by means of shutters 20 slidable in slideways 21 on outer surfaces of the compartment 6, thus enabling the quantity of material passed by the slats 18 of the endless conveyors to the lower worm 10, to be regulated (see Fig. 8). By regulating the size of the openings 19 and the speed of the rotation of the lower worm 10 and the speed of travel of the ground wheels 5 it will be appreciated that a pre-determined quantity of top-dressing material can be distributed per acre on pasture or other land.

To provide a ready means of operating the shutters 20, each shutter 20 is provided with an arm 21a projecting upwardly therefrom, each arm 21a being joined by a cross pin 22 adjustably secured between the arms 21a. A pivotally mounted lever 21b pivotally connected to the cross pin 22 provides means of raising or lowering the shutters 20 from the driving seat of a tractor towing the improved device. As illustrated in Fig. 8, the connection of the cross pin 22 to each arm 21a can be adjusted by inserting the pin 22 in selected ones of a series of holes 23 provided in each arm 21a so that size of the openings 19 can be varied relative to each other to enable a greater quantity of material to be delivered from one bin than from the remaining bin.

Figure 3:
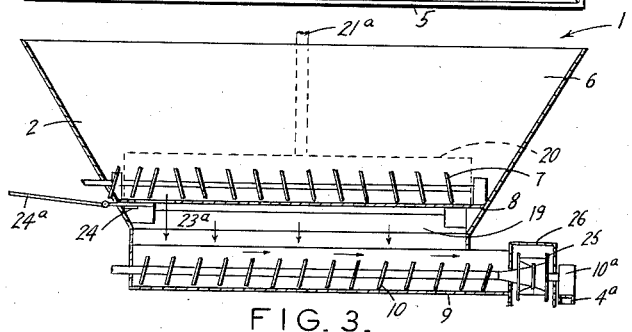
Fig. 3 is a view in elevation in cross section on line A—A Fig. 2.
Figure 5:
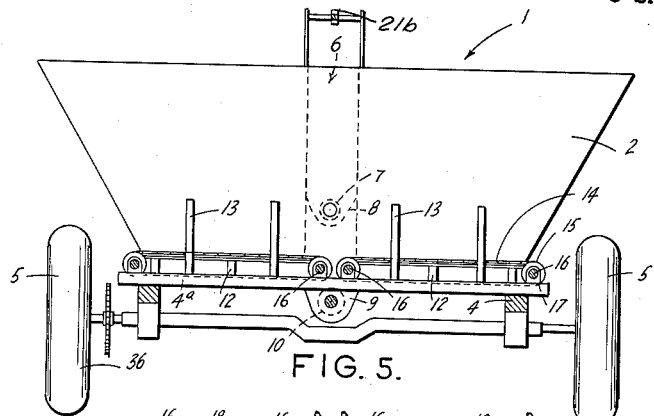
Fig. 5 is a rear view of Fig. 1 in elevation but partly in section.

As illustrated in Fig. 3, the upper trough 8 and the upper worm 7 are mounted within the interior of the compartment 6 and directly above the lower trough 9 and lower worm 10 and an aperture 23a is provided in the bottom of the upper trough 8 towards the forward end of the latter (see Figs. 2 and 3), and to which material deposited in the upper trough 8, is adapted to be carried to drop through the aperture 23a to the lower trough 9. The size of the aperture 23a is adjustable by a slide 24 controlled through suitable linkage 24a from the driving seat of the tractor (not shown). As illustrated, the section of the worm turnings of the upper worm 7 lying to the forward side of the aperture 23a are inclined in the opposed direction to the rest of the worm turnings of the worm 7 so that material in the upper trough 8 lying forwardly of the aperture 23a is carried to the latter upon rotation of the worm 7.

It will be observed particularly from Fig. 3, that the upper worm 7 and the lower worm 10 are adapted to rotate in opposed directions. More specifically, the lower worm 10 is adapted to be rotated in a direction to carry top dressing material to the rear of the hopper for depositing in the top dressing means, while the upper worm 7 is adapted to be rotated in the opposed direction so that material such as seed, and hormone, or fertilizer or the like, is mixed as it is carried by the rotating worm 7 along the trough 8 and deposited through the aperture 23a in the forward end of the upper trough 8 for mixing in the top dressing material in the lower trough 9 as it is carried rearwardly along the length of the lower worm 10 (see arrows Fig. 3).

In this latter connection, and to facilitate mixing of the seed and/or fertilizer in the upper trough 8, the worm 7 can be turned at a higher speed by suitable gearing so that the material in the upper trough 8 is thoroughly mixed prior to it being passed to the lower trough 9. Further, as the top dressing material spread can be controlled to a pre-determined quantity per acre, it is possible by varying the size of the aperture 23a to release a pre-determined quantity of seed, fertilizer, weed killing hormone powder or other additives so that the additive is not only mixed with the top dressing material, but is distributed with the top dressing material in a pre-determined proportion to the acre. To give an example, 2, 4–D Sodium Salt can be mixed with top dressing material at say 8 ounces to the acre to kill "flat" type weeds such as thistles, docks, daisies etc., or again, Dalapon can be mixed with the top dressing material at say 2 lbs. to the acre to effect destruction of "stalk" type weeds, for instance, barley grass, while D.D.T. powder can be added at say 4 lbs. per acre to destroy grass grubs.

To effect such a regulation, a suitable marked control scale can be provided by means of which the tractor operator can operate the linkage to the slide 24 so that only a pre-determined quantity of for example, seed and fertilizer, is mixed with a pre-determined quantity of top dressing material, the regulation of the quantity of top dressing material passing to the lower worm 10 being effected by the shutters 20 of the openings 19.

The top dressing distributing means is preferably of a fan type capable of distributing the top dressing material and other material mixed therewith under the action of forced air over an area of land to the rear of the improved device as the device is drawn along.

Figure 12:
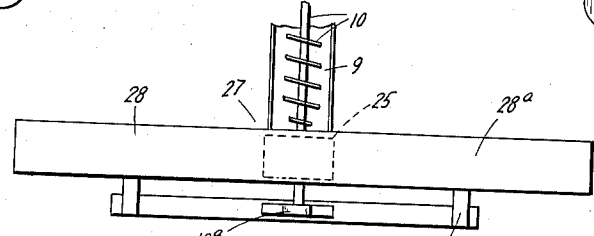
Fig. 12 is a part plan view of Fig. 11.
Figure 13:
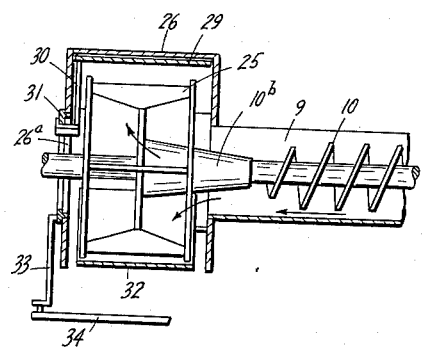
Fig. 13 is a detail view in section elevation on a large scale of the top dressing distributing means.

As illustrated with particular reference to Figs. 3, 12 and 13, the fan 25 forms parts of the lower worm 10 being situated at the rear end of the worm 10, and rotatable within a fan housing 26. The fan housing 26 forms the central portion of a shroud 27 extending laterally from each side of the fan housing 26 which acts to direct the material outwardly under the influence of the fan 25.

Figure 11:
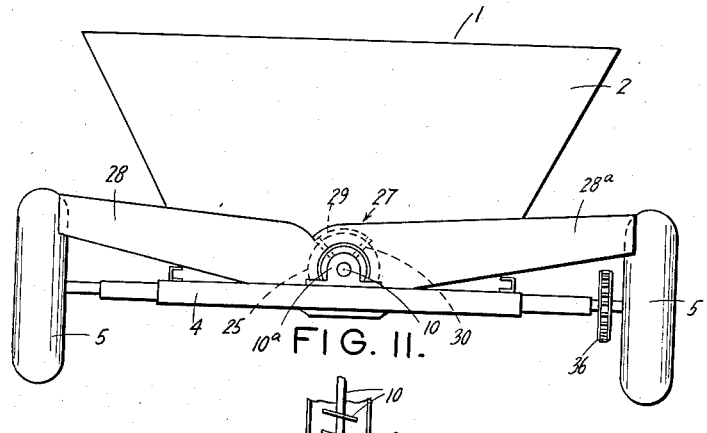
Fig. 11 is a rear view of the hopper showing the top dressing distributing means.

As shown in Figs. 11 and 12, the shroud 27 is formed of material such as sheet metal, and when viewed in plan, is more or less rectangular in shape. The shroud 27 is open along its underside as is the fan housing 26 which forms the central section of the shroud 27, being slightly greater in depth than the remainder of the shroud 27.

The lateral sections of the shroud 27 extending to each side of the fan housing 26 are in the form of chutes 28 and 28a or open bottom ducts, the ends of which are open, each chute 28 and 28a being preferably inclined upwardly at a slight angle when viewed in rear elevation (see Fig. 11).

The wall of the fan housing 26 nearest the lower trough 9 is open to the rear end of the trough 9 and the shaft of the worm 10 extends through the fan housing 26, and is rotatable in a bearing 10a mounted on a rear cross member of the chassis 4.

The fan 25 which is of a rotary blade type, includes a centrally disposed and tapered boss 10b leading to within the area of the blades of the fan 25, the tapered boss 10b acting to direct the material to be distributed, from the lower worm 10, radially of the fan 25.

As shown in Figs. 11, 13, 14, 15, the top dressing distributing means can also include an adjustable deflector arrangement for the purpose of regulating the flow of top dressing material from the fan 25 to the lateral chutes 28 and 28a of the shroud 27 so that a greater quantity of material can be spread from the chute 28 than from the remaining chute 28a and vice versa.

The adjustable deflector arrangement comprises a curved or arcuate shield 29 slidably mounted within the fan housing 26 about the periphery of the fan 25 and at a short distance outwardly from the fan 25. The shield 29 is supported on radial arms 30 extending from a circular bearing 31 slidably supported about an opening 26a in the rear wall of the fan housing 26 and is slightly less in width than of the fan housing 26 so that a small space is provided between each side edge of the shield 29 and the sides of the fan housing 26.

A stationary deflector plate 32 is provided about the bottom of the fan 25 to direct the majority of the material under the action of the fan 25 in an upwardly direction.

Figure 14:
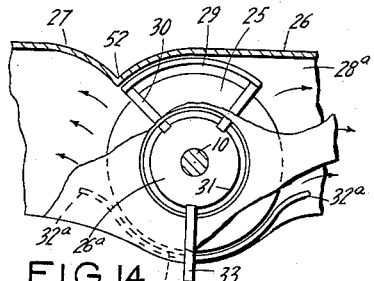
Fig. 14 is a rear elevation of Fig. 13 partly in cross section.
Figure 15:
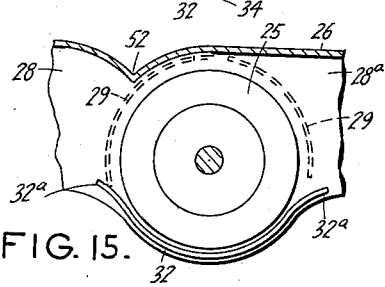
Fig. 15 is a similar view to Fig. 14 in cross section.

As illustrated in Figs. 13 to 15, the deflector plate 32 is more or less arcuate in formation and the ends thereof are curved outwardly as at 32a. The deflector plate 32 is slightly less in width than the width of the fan housing 26 so that a small amount of material thrown radially outwardly by the fan 25 will be directed through the spaces provided at each side of the plate 32 to ground immediately therebeneath.

The length of the arcuate shield 29 is equal approximately to a quarter circle and the arrangement is such that when the shield 29 is moved in one direction so that one end thereof contacts one end 32a of the plate 32, the shield 29 closes the entrance to one chute 28 and the major portion of the material forced radially outwardly by the fan 25 is diverted through the remaining chute 28a (see Fig. 15). Again, the shield 29 can be moved to block the entrance to the opposing chute 28a so that the major portion of the material is diverted through the other chute 28. If desired, the shield 29 can be positioned so that an equal quantity of material is directed to the chutes 28 and 28a.

It is preferred that movement of the shield 29 be controlled by the operator of the tractor towing the device and in this latter connection, an arm 33 is secured to and projected downwardly from the circular bearing 31. Connecting linkage 34 provides the tractor operator with means for moving the shield 29 (see Fig. 13).

To apply motion to the endless conveyors and the upper worm 7, a drive is connected from the ground wheels 5, the drive being illustrated in Figs. 1, 2, and 6 of the drawings. As illustrated, a chain drive 35 is passed about a sprocket 36 on the axle of the ground wheels 5 and about a further sprocket 37 on a lay shaft 38 carried in bearings across the chassis 4 to the front of the hopper 1. At the inner end of the lay shaft 38 a bevelled pinion 39 is in mesh with a crown wheel 40 on a drive shaft 41 which forms an extension of one of the inner axles 16 of one endless conveyor. A sprocket wheel 42 on the drive shaft 41 is in mesh with a further sprocket wheel 42a on the innermost axle 16 of the remaining endless conveyor. Thus upon forward movement of the improved device, the endless conveyors are moved by means of the chain drive 35, sprockets 36 and 37, lay shaft 38, crown wheel 40 and pinion 39, drive shaft 41 and sprocket wheels 42 and 42a (see Fig. 6).

Figure 9:
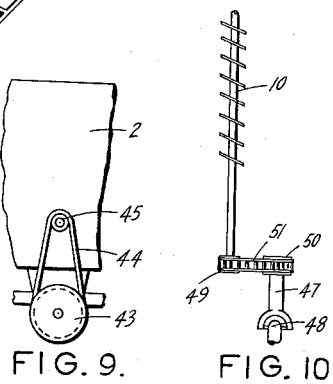
Fig. 9 is a detail view of the drive to the upper worm.

As shown in Figs. 1 and 2, a driving sprocket 43 is provided on the drive shaft 41 and which is connected by a chain and sprocket 44 and 45 (see Fig. 9) to the end of the shaft of the upper worm 7 so that the upper worm 7 is rotated at the same time by rotation of the ground wheels 5.

It is preferred that the drive shaft 41 between the driving sprocket 43 and the sprocket wheel 42 be divided by a suitable clutch 46 (see Fig. 6) so that the drive to the endless conveyors can be stopped when not required for use. The clutch 46 can be operated by any suitable linkage from the tractor operator's seat.

Figure 10:
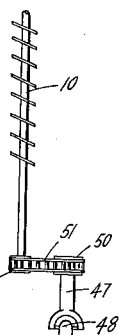
Fig. 10 is a detail view of the lower worm and the drive thereto.

The drive to the lower worm 10 and the fan 25 is preferably taken from the power take off of the towing tractor and to effect such an arrangement, a shaft 47 jointed by a universal connection 48 leads from the power take off of the tractor and is connected by suitable gearing sprockets 49 and 50, and drive chain 51 (see Fig. 10), to the forward end of the shaft of the lower worm 10. Thus upon the power take off being brought into operation, the lower worm 10 and fan 26 are rotated.

The forward end of the chassis 4 is preferably provided with a suitable adjustable type hitch (not shown) to facilitate the hitching of the improved device to tractors of varying makes.

In operation and upon the improved device being drawn forward the endless conveyors are moved to cause the cross slats 18 thereof to carry material from the bins 1a and 1b through the openings 19 for depositing in the lower trough 9 and on the lower worm 10. At the same time, the rotating upper worm 7 which is also driven from the ground wheels 5 carries a mixture of seed and hormone or other material to be mixed with the top dressing material along the upper trough 8 and deposits the material through the aperture 23a into the forward end of the lower trough 9 and on to the lower worm 10 which is rotated from the power take off of the tractor. The mixture is thoroughly mixed by the lower worm 10 and conveyed by the latter to the fan 25 (see arrows Fig. 13), where it is thrown radially by the latter into the chutes 28 and 28a for distribution over the ground as has previously been described.

As illustrated in Figs. 14 and 15, the fan housing 26 can be shaped with a deflecting rib 52, the rib 52 being of a V-shape and formed on the interior surface of the top of the fan housing 26 and slightly to one side of the line of the fan 25. The rib 52 extends across the width of the fan housing 26 and acts to aid in the deflecting of material into the chutes 28 and 28a during rotation of the fan 25.

It will be appreciated from the aforegoing description that although the invention has been described in connection with a hopper mounted on ground wheels and drawn by a tractor, the invention can be constructed in the form of a self powered mobile unit such as a motor vehicle.

What I do claim and desire to obtain by Letters Patent of the United States of America is:

1. A mobile material mixing and dispensing apparatus comprising a mobile frame, hopper means carried by the frame including wall means defining a central compartment and a bin on each side of the central compartment, the compartment and bins being adapted to receive different materials to be dispensed, a trough within said central compartment extending longitudinally thereof and including a bottom spaced above the frame, said bottom having an opening therein adjacent one end of the trough, rotatable worm means within the trough for moving material in the compartment toward said opening, a second trough spaced below the first trough and parallel thereto, said second trough having a discharge opening at the end thereof that is opposite said one end of the first trough, endless conveyor means within each bin and having a run above said second trough and below said first trough movable toward one another transversely of the compartment for moving material from the bins to the second trough, a rotatable worm within the second trough for moving material toward the discharge opening, and means for moving said conveyors and for rotating said worms whereby material in the compartment is moved from the compartment to said one end for passage through said opening, other material is conveyed by the conveyors to said second trough for admixing with the material passing through said opening and the materials in the second trough are conveyed through said discharge opening.

2. An apparatus as claimed in claim 1, in which said wall means defining the compartment and bins is provided with an opening therein and each conveyor run extends in the compartment through the openings in the wall means, and means is provided for adjusting the size of the opening adjacent said one end of the first trough.

3. An apparatus as claimed in claim 1 wherein each of said conveyor means includes a pair of endless chains interconnected by cross slat means and movable on sprockets and shafts rotatably mounted adjacent the bottom of the hopper means.

4. An apparatus as claimed in claim 2 wherein the openings in the means defining the central compartment are each adjustable by a shutter slidable over the opening.

5. An apparatus as claimed in claim 4 wherein each of said shutters is provided with an upwardly extending arm, a cross pin adjustably connected between the arms, and a pivot lever connected to the cross pin to facilitate raising and lowering of the shutters.

6. An apparatus as claimed in claim 5 wherein said adjustable means is a slide slidably mounted across the opening.

7. An apparatus as claimed in claim 1, further including ground wheels for the frame, the upper worm and conveyor means being driven by a chain and shaft drive connected to the ground wheels and clutch means incorporated in the drive to stop movement of the conveyors during movement of the apparatus along the ground.

8. An apparatus as claimed in claim 1 including a distributing means defined by an open ended shroud open along its under surface, a central fan housing, a rotary fan within the housing with the fan housing being in communication with the discharge opening of the second trough and the fan being integrally formed with the worm and the material being passed from the trough to the interior of the fan housing and being discharged radially by the fan from the lateral sections of the shroud.

9. An apparatus as claimed in claim 8 wherein the fan housing includes an arcuate shield mounted on arms secured to a circular bearing rotatable in an aperture formed in the rear wall of the fan housing constituting an adjustable deflector adapted to be moved within the housing to divert the flow of material discharged radially by the fan through either one of the lateral sections of the shroud.

10. An apparatus as claimed in claim 9 wherein the under surface of the top of the fan housing is provided with a V-shaped rib serving to assist in the deflection of the material passing from the fan housing into the lateral sections of the shroud.

References Cited in the file of this patent

UNITED STATES PATENTS

| | | |
|---|---|---|
| 772,941 | Kefauver et al. | Oct. 25, 1904 |
| 2,677,550 | Berger et al. | May 4, 1954 |
| 2,691,236 | Tuft | Oct. 12, 1954 |

FOREIGN PATENTS

| | | |
|---|---|---|
| 1,115,171 | France | Dec. 26, 1955 |
| 25,095 | Great Britain | of 1910 |